No. 719,938. PATENTED FEB. 3, 1903.
W. R. GORRELL.
BUCKET FOR CAN SOLDERING MACHINES.
APPLICATION FILED MAY 19, 1902.
NO MODEL.
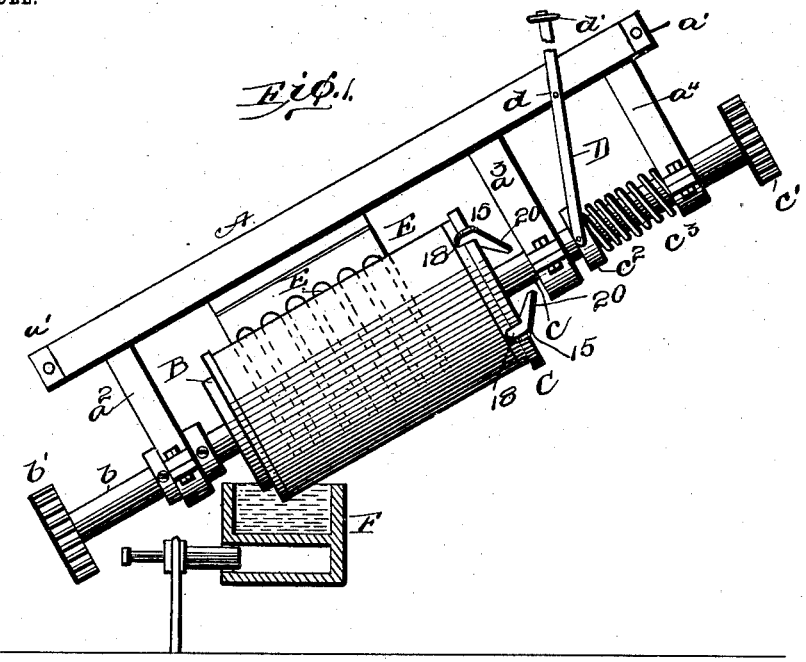
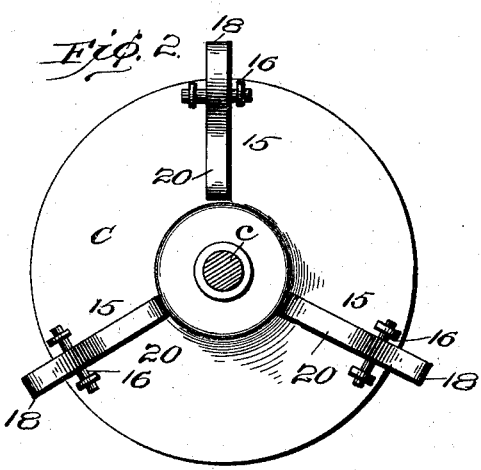
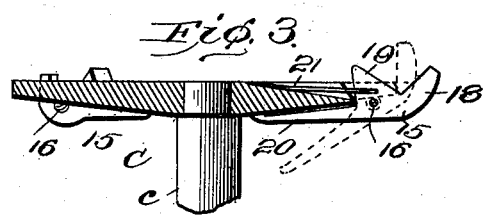
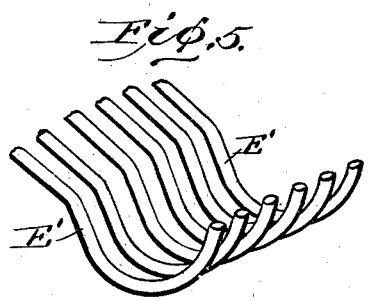
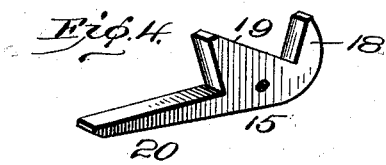
Witnesses:
J. M. Fowler Jr.
F. T. Chapman.
Inventor,
William R. Gorrell,
By Lyons & Rising
Attys.

United States Patent Office.

WILLIAM R. GORRELL, OF HAVRE DE GRACE, MARYLAND, ASSIGNOR OF TWO-THIRDS TO R. HARRY WEBSTER AND STANLEY M. HANWAY, OF HAVRE DE GRACE, MARYLAND.

BUCKET FOR CAN-SOLDERING MACHINES.

SPECIFICATION forming part of Letters Patent No. 719,938, dated February 3, 1903.

Application filed May 19, 1902. Serial No. 108,031. (No model.)

*To all whom it may concern:*

Be it known that I, WILLIAM R. GORRELL, a citizen of the United States, and a resident of Havre de Grace, in the county of Harford and State of Maryland, have invented certain new and useful Improvements in Buckets for Can-Soldering Machines, of which the following is a specification.

The object of my invention is to improve the construction of the so-called "buckets" of that type of can-soldering machine in which an endless conveyer is employed to receive the can-bodies, with the can-heads placed in position thereon, at one point of its travel, to thereupon lead the can through the ordinary solder-trough, in which it is rotated to solder the can-bottom to the can-body, and to then lead the can to a point at which it is discharged from the conveyer. In such buckets as heretofore employed considerable difficulty has been experienced in properly and automatically centering the can between the head and tail clamps of the bucket when the can is taken into the bucket from the chute which carries the supply of unsoldered cans. Even when the can had been properly centered when it was initially received from the chute it was frequently put out of center when it reached the solder-trough and was thrown in contact with the iron or guide with which such troughs are usually supplied. This had the result that the seam of solder which adheres to the can-body and solders the can-body to the can-bottom was of varying width, and this in turn necessitated an adjustment of the parts to give a greater average width of solder on the can-body than would otherwise be required in order to insure that every point around the circumference of the can-bottom would receive some solder, and thus avoid a leak, which would ruin the can. Such greater average width of the soldered seam than is required for the purposes of producing a hermetic joint at all points results in useless waste of solder, which my invention saves. Besides, the buckets as heretofore constructed had a tendency to discharge the soldered cans therefrom in a tilted or canted position. This resulted in congesting the discharge-runway and interfered with the continuity of operation. My bucket is free from this defect.

In accordance with my invention I provide the bucket with the usual rotary tail-disk, the diameter of which must be smaller than that of the can in order to permit the edge of the can to project beyond the circumference of the disk; but instead of using a rotary head-disk of the usual construction I provide this disk with automatic centering devices, preferably in the form of a series of hinged centering-jaws which are actuated by the can when in position and which are thrown out of action when the pressure of the head and tail disks is removed to permit the can to freely drop from the bucket into the discharge-runway of the soldering-machine. In this manner the can is automatically and accurately centered when it is first received in the bucket, it remains firmly gripped and centered during the soldering operation, thus permitting a closer adjustment of parts to produce a narrower and yet efficient soldered seam, and the can drops straight and free from the bucket into the appropriate discharge-runway when the operation of soldering is complete.

In the drawings, Figure 1 represents a side elevation of my improved bucket. Fig. 2 shows an end elevation of the head-disk. Fig. 3 shows a cross-section of the same. Fig. 4 is a detail of the centering-dog, and Fig. 5 shows the end of the chute containing the unsoldered cans.

The bucket-frame A is supplied with any suitable devices $a'$ for securing it to the endless conveyer of the soldering-machine and has rigidly secured thereto the standards $a^2$, $a^3$, and $a^4$. The tail-disk B is secured to the shaft $b$, which is journaled in the standard $a^2$ in any suitable manner, which shaft $b$ carries a cog-wheel $b'$ for engagement with the customary stationary rack of the soldering-machine to rotate the can when in the solder-trough F.

The head-disk C is carried on a shaft $c$, which is journaled in a sliding manner in the standards $a^3$ $a^4$. The shaft $c$ is supplied with a cog-wheel $c'$ similar in construction and operation to the cog-wheel $b'$.

Rigidly secured to the shaft $c$ is a collar $c^2$, between which and the standard $a^4$ is placed a helical spring $c^3$ for the purpose of normally pressing the head-disk toward the tail-disk to clamp the can in position between the two disks. The end of the lever D is pivoted to the collar $c^2$. This lever is hinged at $d$ to the bucket-frame and carries a roller $d'$ at the end removed from the pivot. It will be clear to any one familiar with this class of machines that in the movement of the bucket as a part of the endless conveyer to which it is attached a stationary deflector on the machine-frame pushes against the roller $d'$ to tension the spring $c^3$ and to move the head-disk away from the tail-disk. This occurs twice in a single revolution of the conveyer—once when the can is to be received in the bucket and again when it is to be discharged therefrom. The bucket-frame also carries a series of curved fingers E, which coöperate with the fingers E' of the can-chute in a manner which will be readily understood. An unsoldered can lying on the fingers E', the machine is so arranged that the motion of the endless conveyer brings the fingers E up from below to pass between the fingers E' to remove the can therefrom. The can then lies on the fingers E with the head-disk drawn back. The fingers E are below the can. Thereupon the roller $d'$ passes off the deflector with which it coöperates and the head-disk, impelled by the spring $c^3$, flies into place to clamp the can. The conveyer is so arranged that when it has moved around to bring the can in juxtaposition to the soldering-trough the fingers E will be above the can, so as not to interfere with the soldering operation. This same position of parts is maintained after the can has left the soldering-trough and is to be discharged from the bucket.

I come now to the description of the parts in which my invention more particularly resides. The head-disk C is supplied with radial slots, as shown, in which are journaled the centering-dogs 15. The journals for these dogs are shown at 16. Each dog has a centering-shoulder 18 to engage and center the sides of the can, a lug 19, and a tailpiece 20 to limit the outward movement of the dog. A leaf-spring 21 is provided for each dog and is fixed at one end to the disk and moves at its other end in a slot in the lug 19. It thus normally serves to force the dog to the retracted position shown in full lines in Fig. 3. In this position of the dog the tailpiece 20 contacts with the outer face of the disk C and limits the rearward movement of the dog under the action of the spring. The springs 21 are preferably countersunk, as shown, to obviate any liability of the head of the clamped can from coming into contact therewith.

The operation will now be clear. Assuming an unsoldered can with its axis horizontal to lie on the fingers E with the head-disk withdrawn, the lever D permits the spring $c^3$ to force the head-disk toward the can. The can-head contacting with the lugs 19 the dogs 15 are tilted against the tension of the springs 21 to throw the centering-shoulders 18 into engagement with the sides of the can. The can is thus automatically centered and clamped against the tail-disk. The axis of the can by the motion of the endless carrier having now been tilted into an inclined position it passes through and is rotated in the solder-trough. Having passed through the solder-trough, the motion of the endless carrier brings the fingers E above the can and again tilts the axis of the can back into a horizontal position. The lever D thereupon retracts the head-disk against the tension of the spring $c^3$. The springs 21 thereupon immediately act to tilt the dogs 15 to withdraw the centering-shoulders 18 and to project the lugs 19 against the can-head. The can is therefore free to drop without obstruction and consequent tilt into its proper chute.

It is now clear that my bucket is mounted on the carrier in such a manner that its frame is what I term "axially tilting," meaning that the axis of the bucket is at one time horizontal and at another time tilted to the horizontal.

It is clear that a movable collar on the shaft $c$, acting against the tailpieces 20, would have the same effect as the springs 21. It is equally clear that I am not limited to the specific construction of the parts shown, but may vary them without departing from the spirit of the invention as embodied in the claims.

What I claim is—

1. A bucket for can-soldering machines comprising rotary head and tail disks normally pressed toward each other to clamp a can between them and automatically-movable can-centering devices mounted on the head-disk, substantially as described.

2. A bucket for can-soldering machines comprising rotary head and tail disks normally pressed toward each other to clamp a can between them and automatic centering-dogs pivoted on the head-disk to center the can, substantially as described.

3. A bucket for can-soldering machines comprising rotary head and tail disks normally pressed toward each other to clamp a can between them and spring-pressed centering-dogs pivoted on the head-disk to center the can, substantially as described.

4. A bucket for can-soldering machines comprising rotary head and tail disks normally pressed toward each other to clamp a can between them and can-actuated centering devices mounted on the head-disk, substantially as described.

5. A bucket for can-soldering machines comprising rotary head and tail disks normally pressed toward each other to clamp a can between them and can-actuated centering-dogs pivoted on the head-disk, substantially as described.

6. A bucket for can-soldering machines comprising rotary head and tail disks normally pressed toward each other to clamp a can between them and dogs, each comprising a centering-shoulder, pivoted to the head-disk, substantially as described.

7. A bucket for can-soldering machines comprising rotary head and tail disks normally pressed toward each other to clamp a can between them and dogs, each comprising a centering-shoulder and a can-actuated lug, pivoted to the head-disk to center the can by its pressure against the lugs, substantially as described.

8. A bucket for can-soldering machines comprising rotary head and tail disks normally pressed toward each other to clamp a can between them and dogs, each comprising a centering-shoulder, can-actuated lug and tailpiece, pivoted to the head-disk, substantially as described.

9. A bucket for can-soldering machines comprising an axially-tilting frame, rotary head and tail disks normally pressed against each other to clamp a can between them, and automatically-movable can-centering devices mounted on the head-disk, substantially as described.

10. A bucket for can-soldering machines comprising an axially-tilting frame, rotary head and tail disks normally pressed toward each other to clamp a can between them, and automatic centering-dogs pivoted on the head-disk to center the can, substantially as described.

11. A bucket for can-soldering machines comprising an axially-tilting frame, rotary head and tail disks normally pressed against each other to clamp a can between them, and can-actuated centering devices mounted on the head-disk, substantially as described.

In testimony whereof I have signed my name to this specification in the presence of two subscribing witnesses.

WILLIAM R. GORRELL.

Witnesses:
WM. A. LEFFLER,
A. N. MITCHELL.